US012688718B2

(12) United States Patent　　(10) Patent No.: US 12,688,718 B2
Kanemaru et al.　　(45) Date of Patent: Jul. 21, 2026

(54) OBJECT DETECTING DEVICE, OBJECT DETECTING METHOD, AND RECORDING MEDIUM

(71) Applicant: Nuvoton Technology Corporation Japan, Kyoto (JP)

(72) Inventors: Masaki Kanemaru, Tokyo (JP); Tetsuro Okuyama, Osaka (JP); Yoshinao Kawai, Kyoto (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 288 days.

(21) Appl. No.: 18/538,638

(22) Filed: Dec. 13, 2023

(65) Prior Publication Data

US 2024/0112478 A1　　Apr. 4, 2024

Related U.S. Application Data

(63) Continuation of application No. PCT/JP2022/023092, filed on Jun. 8, 2022.

(30) Foreign Application Priority Data

Jun. 17, 2021　(JP) ................................ 2021-100600

(51) Int. Cl.
*G06V 20/64*　　(2022.01)
*G01S 7/48*　　(2006.01)
(Continued)

(52) U.S. Cl.
CPC .......... *G06V 20/647* (2022.01); *G01S 7/4802* (2013.01); *G01S 17/894* (2020.01);
(Continued)

(58) Field of Classification Search
CPC .... G06V 20/647; G06V 10/60; G06V 10/762; G06V 10/803; G06V 20/50;
(Continued)

(56) References Cited

U.S. PATENT DOCUMENTS

| | | | | |
|---|---|---|---|---|
| 9,183,459 | B1* | 11/2015 | Zhang | G06V 10/255 |
| 11,398,041 | B2* | 7/2022 | Yamasaki | G06T 7/50 |
| 2005/0063606 | A1* | 3/2005 | Kita | G06T 7/11 |
| | | | | 382/260 |
| 2007/0159536 | A1* | 7/2007 | Lin | H04N 9/73 |
| | | | | 348/E9.051 |

(Continued)

FOREIGN PATENT DOCUMENTS

| | | |
|---|---|---|
| JP | 2011-128756 A | 6/2011 |
| JP | 2016-189504 A | 11/2016 |

(Continued)

OTHER PUBLICATIONS

International Search Report dated Jul. 19, 2022 issued in International Patent Application No. PCT/JP2022/023092, with English translation.

*Primary Examiner* — Amandeep Saini
*Assistant Examiner* — Emma Rose Goebel
(74) *Attorney, Agent, or Firm* — Rimon P.C.

(57) ABSTRACT

An object detecting device includes: a first luminance obtainer and a distance obtainer that obtain a first luminance image and a depth image, respectively; a first clustering unit that generates a group that is a set of pixels taken as the same object in the depth image, and determines that the group is a cluster when a total number of pixels included in the group is at least a first threshold; a second clustering unit that determines that the group is a cluster, when (i) the total number of pixels included in the group is less than the first threshold and (ii) luminance of a pixel group in the first luminance image which corresponds to the group is at least a second threshold; and a 3D object detector that generates 3D object information indicating an object in the depth image which is detected based on the cluster.

20 Claims, 5 Drawing Sheets

(51) Int. Cl.

| | |
|---|---|
| *G01S 17/894* | (2020.01) |
| *G06V 10/60* | (2022.01) |
| *G06V 10/762* | (2022.01) |
| *G06V 10/80* | (2022.01) |
| *G06V 20/50* | (2022.01) |

(52) U.S. Cl.
CPC ............ *G06V 10/60* (2022.01); *G06V 10/762* (2022.01); *G06V 10/803* (2022.01); *G06V 20/50* (2022.01)

(58) Field of Classification Search
CPC .... G06V 10/143; G06V 10/811; G06V 20/64; G01S 7/4802; G01S 17/894; G01S 7/4863; G01S 7/4865; G01S 7/4915; G01S 17/10; G01S 17/86; G01S 17/931; G06T 2207/10028; G06T 7/11
See application file for complete search history.

(56) References Cited

U.S. PATENT DOCUMENTS

| | | | | |
|---|---|---|---|---|
| 2011/0304719 | A1* | 12/2011 | Sekine ...................... | G06T 7/11 |
| | | | | 348/E7.085 |
| 2019/0138822 | A1 | 5/2019 | Yao et al. | |
| 2019/0206071 | A1 | 7/2019 | Yan et al. | |
| 2019/0384232 | A1* | 12/2019 | Casey ................... | G06V 10/60 |
| 2020/0167913 | A1* | 5/2020 | Singer ................. | G06V 20/695 |
| 2022/0120910 | A1 | 4/2022 | Okuyama et al. | |

FOREIGN PATENT DOCUMENTS

| | | | |
|---|---|---|---|
| JP | 2019-149149 | A | 9/2019 |
| JP | 2019-533133 | A | 11/2019 |
| WO | 2019/037129 | A1 | 2/2019 |
| WO | 2021/005659 | A1 | 1/2021 |

* cited by examiner

OBJECT DETECTING DEVICE, OBJECT DETECTING METHOD, AND RECORDING MEDIUM

CROSS REFERENCE TO RELATED APPLICATIONS

This is a continuation application of PCT International Application No. PCT/JP2022/023092 filed on Jun. 8, 2022, designating the United States of America, which is based on and claims priority of Japanese Patent Application No. 2021-100600 filed on Jun. 17, 2021. The entire disclosures of the above-identified applications, including the specifications, drawings and claims are incorporated herein by reference in their entirety.

FIELD

The present disclosure relates to an object detecting device, an object detecting method, and a recording medium.

BACKGROUND

Patent Literature (PTL) 1 discloses a method and a device for recovering point cloud data using a built model. PTL 2 discloses a method and a system for detecting environmental information of a vehicle.

CITATION LIST

Patent Literature

PTL 1: Japanese Unexamined Patent Application Publication No. 2019-149149
PTL 2: Japanese Unexamined Patent Application Publication (Translation of PCT Application) No. 2019-533133

SUMMARY

Technical Problem

However, detection of an object in three-dimensional point cloud data obtained from a captured image is difficult when the reflectance of the captured object is low. For example, when the captured image includes an agricultural implement such as a tractor, detection of objects such as the hood and headlight of the agricultural implement are relatively easy since each of these objects has a high reflectance. In contrast, detection of objects such as tires, weights, and windows of the agricultural implement is difficult since each of these objects has a low reflectance. Other than agricultural implements, detection of objects having a low reflectance is difficult.

In view of the above, the present disclosure provides an object detecting device, an object detecting method, and a recording medium that have increased ability to detect an object having a low reflectance.

Solution to Problem

An object detecting device according to one aspect of the present disclosure includes: a distance obtainer that obtains a depth image; a first luminance obtainer that obtains a first luminance image corresponding to an image-capturing area same as an image capturing area of the depth image; a first clustering unit that generates a group that is a set of pixels that is within a certain range and is taken as a same object in the depth image, and determines that the group is a cluster when a total number of pixels included in the group is at least a first threshold; a second clustering unit that determines that the group is a cluster, when (i) the total number of pixels included in the group is less than the first threshold and (ii) luminance of a pixel group that is in the first luminance image and corresponds to the group is at least a second threshold; and a three-dimensional (3D) object detector that detects an object in the depth image based on the cluster, and generates 3D object information indicating the object detected.

An object detecting method according to one aspect of the present disclosure includes: obtaining a first luminance image corresponding to an image-capturing area, and a depth image corresponding to the image-capturing area of the first luminance image; generating a group that is a set of pixels that is within a certain range and is taken as a same object in the depth image; performing a first clustering process of determining that the group is a cluster included in an object, when a total number of pixels included in the group is at least a first threshold; performing a second clustering process of determining that the group is a cluster, when (i) the total number of pixels included in the group is less than the first threshold and (ii) luminance of a pixel group that is in the first luminance image and corresponds to the group is at least a second threshold; and detecting an object in the depth image based on the cluster to generate 3D object information indicating the object detected.

A recording medium according to one aspect of the present disclosure is a non-transitory computer-readable recording medium for use in a computer, the recording medium having recorded thereon a computer program for causing the computer to execute the above-described object detecting method.

Note that these comprehensive or specific aspects of the present disclosure may be implemented by a system, a method, an integrated circuit, a computer program, or a recording medium such as a computer-readable CD-ROM, or by an optional combination of the system, the method, the integrated circuit, the computer program, and the recording medium.

Advantageous Effects

An object detecting device, an object detecting method, and a recording medium according to the present disclosure can increase the ability to detect an object having a low reflectance.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, embodiments will be described in detail with reference to the drawings.

Note that the embodiments below each describe a general or specific example. The numerical values, shapes, materials, elements, the arrangement and connection of the elements, steps, orders of the steps etc. illustrated in the following embodiments are mere examples, and are not intended to limit the present disclosure.

Embodiment 1

[1.1 Configuration]

Figure 1:
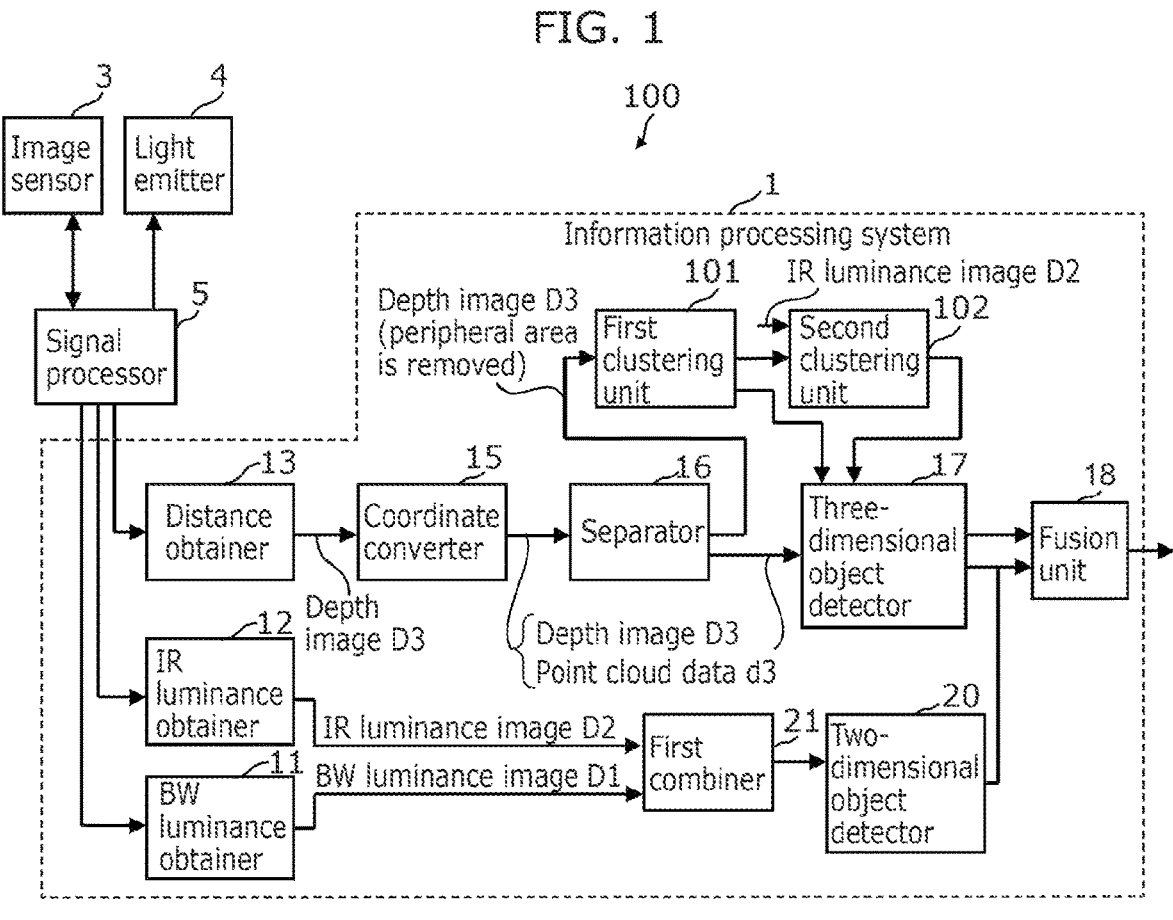
FIG. 1 is a block diagram illustrating an example of a configuration of an object detecting device according to Embodiment 1.

First, a configuration of object detecting device 100 according to the embodiment will be described. FIG. 1 is a block diagram illustrating an example of a configuration of object detecting device 100 according to Embodiment 1. Object detecting device 100 shown in FIG. 1 is a device included in a mobile object, for example. Object detecting device 100 captures images of monitoring areas set in, for example, the front, the rear, and the sides of the mobile object to detect an object included in captured two-dimensional images and captured three-dimensional images. For this reason, object detecting device 100 includes image sensor 3, light emitter 4, signal processor 5, and information processing system 1. Hereinafter, a two-dimensional image and a three-dimensional image may be abbreviated as a 2D image and a 3D image, respectively.

Figure 2:
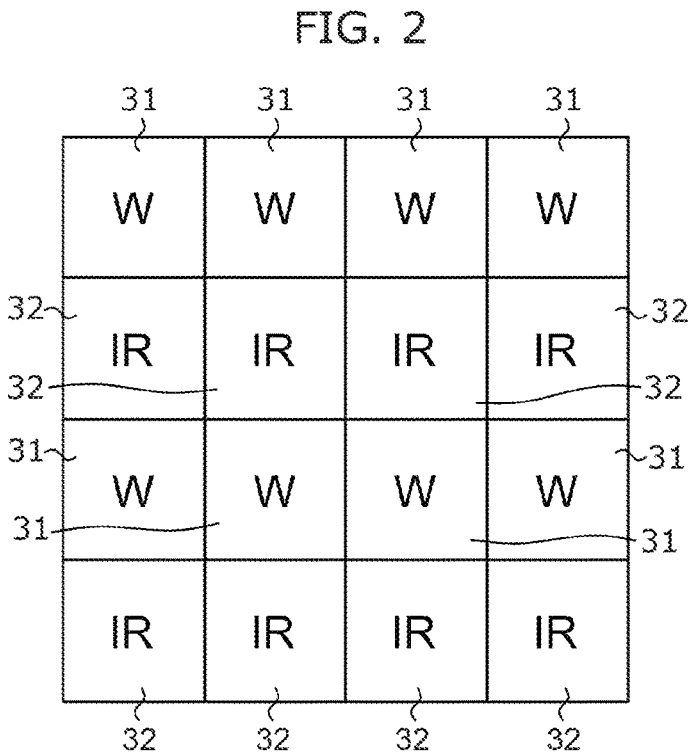
FIG. 2 is a diagram illustrating an example of an array of pixels of an image sensor according to Embodiment 1.

Image sensor 3 is a solid-state imaging element including a plurality of pixels disposed in a matrix, and generates a pixel signal under the control of signal processor 5. One example of a pixel array of image sensor 3 is shown in FIG. 2. In FIG. 2, image sensor 3 includes second pixels 31 and first pixels 32. In FIG. 2, the letter "W" is given to second pixel 31 that has sensitivity to visible light to denote "white" as in white in the shades of "black and white". Second pixel 31 may be provided with an optical filter that prevents infrared light. Moreover, the word "IR" is given to first pixel 32 that has sensitivity to infrared light to denote "infrared". First pixel 32 may be provided with an optical filter that prevents visible light.

Note that a pixel array of image sensor 3 is not limited to the pixel array shown in FIG. 2. For example, second pixel 31 and first pixel 32 may be alternately arrayed in the row direction. Second pixel 31 and first pixel 32 may be alternately arrayed in the row direction and the column direction. Although the number of rows of second pixels 31 and the number of rows of first pixels 32 are the same in FIG. 2, these numbers of rows may be different. In addition, image sensor may include an R pixel having sensitivity to red light, a G pixel having sensitivity to green light, a B pixel having sensitivity to blue light, and an IR pixel having sensitivity to infrared light. In this case, an R pixel, a G pixel, a B pixel, and an IR pixel may be arrayed in a square matrix.

Light emitter 4 emits pulse light that is infrared light according to a timing signal output from signal processor 5.

Light emitter 4 outputs light having a wavelength range to which first pixel 32 of image sensor 3 has sensitivity. In other words, light emitter 4 outputs infrared light. Light emitter 4 includes an element, such as a light-emitting diode (LED) or a laser diode, that has a relatively fast response speed and can rapidly flicker, for example.

Signal processor 5 controls image sensor 3 to generate a luminance image and a depth image. Specifically, signal processor 5 generates BW luminance image D1 and IR luminance image D2 as luminance images, and depth image D3 as a depth image. Here, BW is an abbreviation of black and white. IR is an abbreviation of infrared light. More specifically, signal processor 5 generates BW luminance image D1 using pixel signals obtained from second pixels 31. In addition, signal processor 5 generates IR luminance image D2 using pixel signals obtained from first pixels 32. Furthermore, signal processor 5 uses image sensor 3 to control distance measurement using a time-of-flight (TOF) method, to generate depth image D3 from pixel signals obtained from first pixels 32. Depth image D3 is a set of pixels each indicating a distance value of a distance from image sensor 3 to an object. In other words, each pixel included in depth image D3 indicates a distance value of a distance from image sensor 3 to an object that has reflected pulse light output by light emitter 4.

Hereinafter, a specific process performed by signal processor 5 for obtaining depth image D3 will be described in a simple manner using one example. In this embodiment, signal processor 5 causes light emitter 4 to output light whose intensity is modulated (hereinafter, also called "intensity-modulated light" or "pulse light") to a monitoring area for measuring a time taken from light emitter 4 projecting (emitting) light to image sensor 3 receiving reflected waves. Signal processor 5 then measures the time using a phase difference between a phase of an intensity change at a time point at which image sensor 3 received light and a phase of an intensity change at a time point at which light emitter 4 projected light. When the frequency of an intensity change in intensity-modulated light is constant, a phase difference can be converted into a distance to an object by carrying out a relatively simple arithmetic operation.

For instance, suppose intensity-modulated light whose intensity changes is projected onto a white line from light emitter 4, and intensity of light received by a single first pixel 32 of image sensor 3 is changed. Since a time difference between the same phases reflects a distance to an object, distance L can be expressed by Equation 1 as shown below, where the speed of light is denoted by c [m/s] and a time difference is denoted by $\Delta t$ [s].

$$L = c \cdot \Delta t / 2 \tag{Equation 1}$$

Moreover, time difference $\Delta t$ can be expressed by Equation 2 as shown below, where a frequency of a modulation signal that modulates light intensity is denoted by f [Hz] and a phase difference is denoted by $\Phi$ [rad].

$$\Delta t = \Phi / 2 \pi f \tag{Equation 2}$$

Accordingly, calculation of phase difference $\Phi$ determines distance L to an object.

In order to calculate phase difference $\Phi$, light receiving intensity of each of different phases of a modulation signal is to be calculated for each of first pixels 32 of image sensor 3. In reality, a received light amount in each phase section having a predetermined phase interval (time interval) is detected for each first pixel 32 of image sensor 3, and a received light output corresponding to the received light amount is used for carrying out an arithmetic operation of phase difference Φ. Suppose, as one example, phase sections are at intervals of 90 degrees, four equivalent phase sections can be periodically obtained for one cycle of a modulation signal. In this case, phase difference Φ can be expressed by Equation 3 shown below, where received light amounts for respective phase sections are denoted by C0 through C3.

$$\Phi = \tan^{-1}[(C0-C2)/(C1-C3)] \qquad \text{(Equation 3)}$$

The sign of phase difference Φ changes depending on which of received light amounts C0 through C3 correspond to which of the phases of a modulation signal; however, an absolute value is to be used for phase difference Φ.

As described, signal processor 5 is provided because projection of intensity-modulated light from light emitter 4 and detection of a received light amount for each specific phase section are necessary. Signal processor 5 provides a modulation signal for light emitter 4 to drive light emitter 4 such that intensity-modulated light as described above is projected. Received light outputs corresponding to received light amounts C0 through C3 for respective four phase sections are obtained from image sensor 3, and the received light amounts (electrical signals) are input to signal processor 5. Signal processor 5 carries out an arithmetic operation for determining a distance to an object using these received light outputs. When the above-described arithmetic operation is carried out, signal processor 5 provides, for image sensor 3, a readout signal generated based on a reference signal that is synchronized with a modulation signal to read out the received light outputs.

Information processing system 1 shown in FIG. 1 detects an object in luminance images and a depth image generated in signal processor 5. For this reason, information processing system 1 includes BW luminance obtainer 11, IR luminance obtainer 12, distance obtainer 13, coordinate converter 15, first clustering unit 101, second clustering unit 102, separator 16, three-dimensional object detector 17, and fusion unit 18. Note that BW luminance obtainer 11 is a specific example of one of the first luminance obtainer described above and a second luminance obtainer to be described later. IR luminance obtainer 12 is a specific example of the other of the first luminance obtainer described above and a second luminance obtainer to be described later. Information processing system 1 may include a computer system including at least one processor and at least one memory. This computer system may be any of a system on a chip (SoC), a server, and cloud computing. A processor executes a program recorded on a memory to implement a function of information processing system 1. A program may be recorded on a memory in advance, may be provided by being recorded on a non-transitory recording medium such as a memory card, and may be provided through an electric communication line. In other words, the above program is a program for causing the at least one processor to function as information processing system 1.

BW luminance obtainer 11 obtains BW luminance image D1 from signal processor 5.

IR luminance obtainer 12 obtains IR luminance image D2 from signal processor 5.

Distance obtainer 13 obtains depth image D3 from signal processor 5.

Coordinate converter 15 performs a coordinate conversion process on depth image D3 to convert the coordinates of depth image D3 into an orthogonal coordinate system represented by X, Y, and Z. Specifically, coordinate converter 15 generates, based on depth image D3, point cloud data including points each having coordinate values of X, Y, and Z. Point cloud data is also called a point cloud. Depth image D3 that is output from coordinate converter 15 and whose coordinates have been converted, namely point cloud data, will be hereinafter called point cloud data d3. Coordinate converter 15 outputs depth image D3 and point cloud data d3 to separator 16.

Separator 16 separates an object and a peripheral area located around the object. A "peripheral area" is, for example, a road surface, the ground, or a floor that is to be excluded from being detected when the presence of an object is to be detected. In other words, separator 16 separates (i) an area including an object, other than an area including a road surface, etc., and (ii) a peripheral area such as a road surface. Separator 16 separates an object and a peripheral area based on point cloud data d3 generated in coordinate converter 15.

In this embodiment, separator 16 extracts, in the first place, a component corresponding to a peripheral area from within point cloud data d3 and depth image D3, based on point cloud data d3 generated in coordinate converter 15. Separator 16 then removes an extracted peripheral area from depth image D3 to output a component corresponding to an object in depth image D3 to first clustering unit 101. In addition, separator 16 removes the extracted peripheral area from point cloud data d3 to output a component corresponding to the object in point cloud data d3 to three-dimensional object detector 17. Here, a peripheral area indicates all areas other than an area in which an object is present in depth image D3, and includes not only an area in the vicinity of the object, but also includes an area far from the object.

First clustering unit 101 performs a first clustering process on depth image D3 input from separator 16. Specifically, first clustering unit 101 generates a group that is a set of pixels that is within a certain range and is taken as the same object in depth image D3 input from separator 16, and determines that the group is a cluster when the number of pixels included in the group is at least a first threshold.

Second clustering unit 102 performs a second clustering process on depth image D3 input from separator 16 and IR luminance image D2 input from IR luminance obtainer 12. Specifically, when the number of pixels included in the group generated in first clustering unit 101 is less than the first threshold, second clustering unit 102 determines that the group is a cluster when the luminance of a pixel group that is pixel group of IR luminance image D2 and corresponds to the group is at least a second threshold. With this, the second clustering process can detect, as a cluster, a portion of or the entirety of an object having a low reflectance when the portion of or the entirety of the object cannot be detected as a cluster in the first clustering process.

Note that the luminance of a pixel group used in the second clustering process may be the average luminance of pixels included in the pixel group, or may be the maximum luminance of the pixels included in the pixel group. In other words, a cluster may be detected using the average luminance as the reference for an object having a low luminance, or a cluster may be detected using the maximum value as the reference for the object having a low luminance.

In addition, the luminance of a pixel group used in the second clustering process may include both of the average luminance and the maximum luminance of the pixel group. In this case, the second threshold includes a threshold for the average luminance and a threshold for the maximum luminance. Second clustering unit 102 may determine that the group is a cluster, when the average luminance is at least the threshold for the average luminance and is at least the threshold for the maximum luminance. This can increase the ability to detect a cluster for an object having a low reflectance since the cluster is detected using both the average luminance and the maximum luminance as the references.

Note that the first threshold and the second threshold can be predetermined experimentally, statistically, or through simulation.

Three-dimensional object detector 17 detects, based on a cluster determined by first clustering unit 101 and second clustering unit 102, an object from point cloud data d3 that is input from separator 16 to generate 3D object information indicating a target that is the detected object. In this embodiment, point cloud data d3 from which a peripheral area is removed is input to three-dimensional object detector 17 from separator 16. Three-dimensional object detector 17 detects, as an object, a point cloud corresponding to one cluster or two or more consecutive clusters determined by first clustering unit 101 and second clustering unit 102 from within point cloud data d3 input from separator 16, and outputs the point cloud as 3D object information.

Fusion unit 18 merges or combines 2D object information that is a detection result obtained by two-dimensional object detector 20 and 3D object information that is a detection result obtained by three-dimensional object detector 17 together.

Two-dimensional object detector 20 detects an object from a two-dimensional composite image that is output from first combiner 21 to generate 2D object information indicating the detected object. Here, a composite image is any of (i) an image obtained by combining BW luminance image D1 and IR luminance image D2 using a weighting factor, (ii) BW luminance image D1, and (iii) IR luminance image D2. Two-dimensional object detector 20 may use, for example, artificial intelligence technology (AI technology) for detection of an object. A "type" and an "attribute" may be determined for an object to be detected. Classification of an object type includes a distinction between (i) a human and non-human animals or objects, (ii) a mobile object (a human, an automobile, a bicycle, etc.) and an immobile object, (iii) a street tree, a traffic light, guardrail, etc. In addition, an "attribute" of an object includes the size, color, movement (change), etc. of the object. Furthermore, when an object is a human, an "attribute" of the object may also include the gender, height, figure, age, etc. When an object is a mobile object, an "attribute" of the object may also include the traveling direction, traveling speed, etc.

First combiner 21 combines BW luminance image D1 from BW luminance obtainer 11 and IR luminance image D2 from IR luminance obtainer 12 together. Since BW luminance image D1 and IR luminance image D2 are both two-dimensional images, a combination of BW luminance image D1 and IR luminance image D2 generates a composite image. The term "combination" in the present disclosure includes a weighted combination. For example, when a weighting factor of BW luminance image D1 and IR luminance image D2 is "1:0", BW luminance image D1 is output from first combiner 21 as a composite image without being processed. Alternatively, when a weighting factor of BW luminance image D1 and IR luminance image D2 is "0:1", IR luminance image D2 is output from first combiner 21 as a composite image without being processed. In other words, first combiner 21 has a function as a selector that alternatively outputs BW luminance image D1 and IR luminance image D2. A composite image output from first combiner is input to two-dimensional object detector 20. For this reason, first combiner 21 may be appropriately controlled such that an output of first combiner 21 is a composite image suitable for an operation of two-dimensional object detector 20. For example, a composite image output from first combiner 21 may be generated by appropriately changing a weighting factor according to the state of a white line during the day or the night, in the weather such as rain or fog, etc.

[1.2 Operation]

Figure 3:
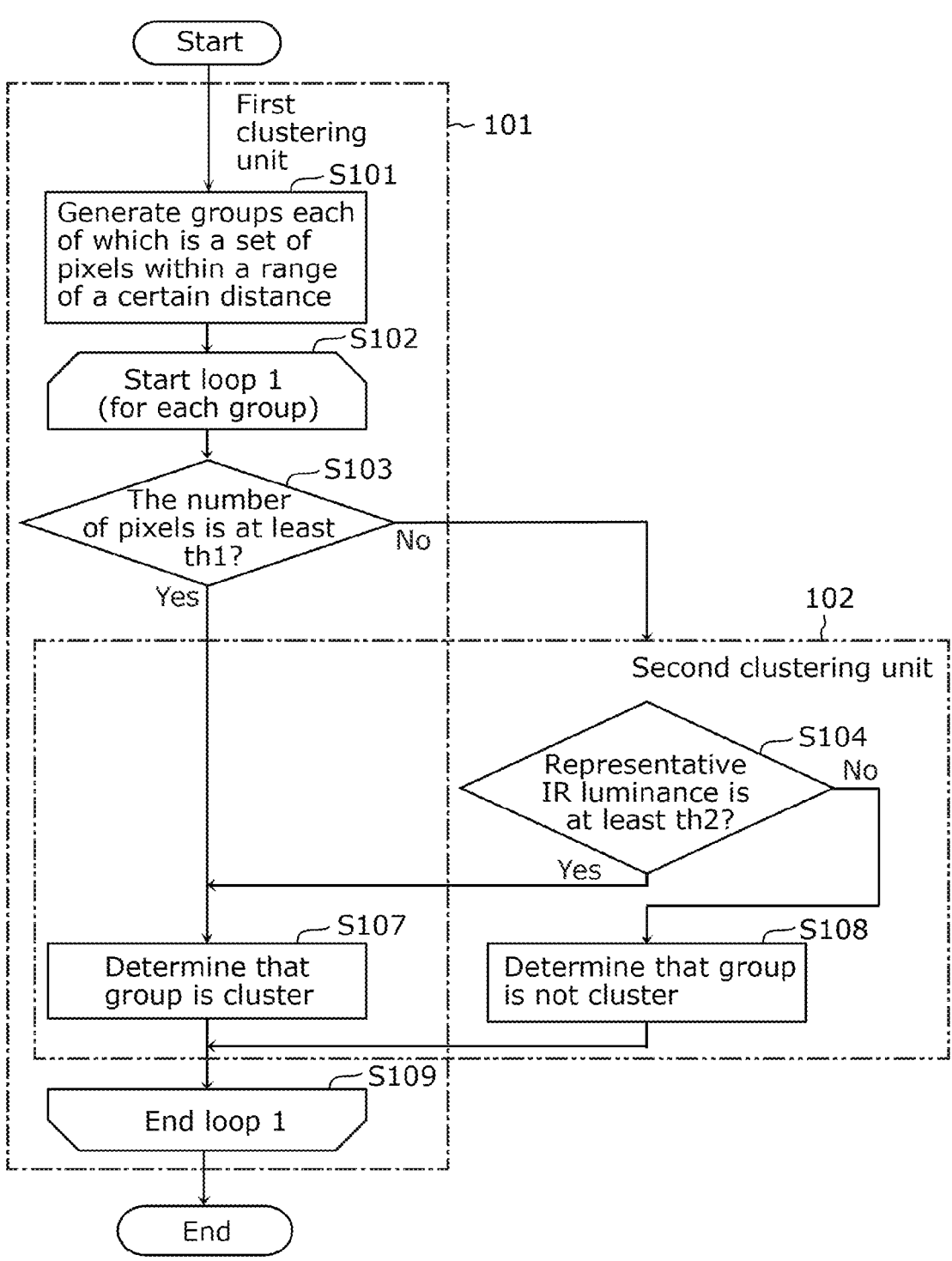
FIG. 3 is a flowchart illustrating a specific example of a first clustering process and a second clustering process according to Embodiment 1.

First, operations performed by object detecting device 100 according to the embodiment will be described. Here, a specific example of the first clustering process and second clustering process that are operations performed by object detecting device 100 will be described. FIG. 3 is a flowchart illustrating a specific example of the first clustering process and the second clustering process according to Embodiment 1.

Steps S101 through S103 and S107 approximately correspond to the first clustering process performed by first clustering unit 101. Steps S104, S107 and S108 approximately correspond to the second clustering process performed by second clustering unit 102.

First, first clustering unit 101 generates groups each of which is a set of pixels that is within a certain range and is taken as the same object in depth image D3 input from separator 16 (S101). First clustering unit 101 further performs processes (S103 through S109) of loop 1 that are processes repeatedly performed for each of generated groups.

In loop 1, first clustering unit 101 determines whether the number of pixels included in a group is at least a first threshold (S103), and determines that the group is a cluster when first clustering unit 101 determines that the number of pixels is at least the first threshold (Yes in S103). Here, "determin[ing] that the group is a cluster" indicates detecting a set of pixels included in the group as a cluster corresponding to a portion of or the entirety of an object. In addition, when first clustering unit 101 determines that the number of pixels is not at least the first threshold (No in S103), first clustering unit 101 determines that the group is not a cluster. The group is then to be processed by second clustering unit 102.

Second clustering unit 102 performs the following process on the group that was not determined as a cluster by first clustering unit 101. Specifically, second clustering unit 102 extracts, for the group not determined as a cluster, a pixel group that is in IR luminance image D2 and corresponds to the group, and determines whether the luminance of the extracted pixel group is at least a second threshold (S104). Furthermore, when second clustering unit 102 determines that the luminance of the pixel group is at least the second threshold (Yes in S104), second clustering unit 102 determines that the group is a cluster (S107). Alternatively, when second clustering unit 102 determines that the luminance of the pixel group is not at least the second threshold (No in S104), second clustering unit 102 determines that the group is not a cluster (S108).

The above-described second clustering process performed by second clustering unit 102 can detect, as a cluster, a portion of or the entirety of an object having a low reflectance when the portion of or the entirety of the object cannot be detected as a cluster in the first clustering process. Accordingly, second clustering unit 102 can increase the ability to detect a cluster.

[1.3 Variation]

Figure 4:
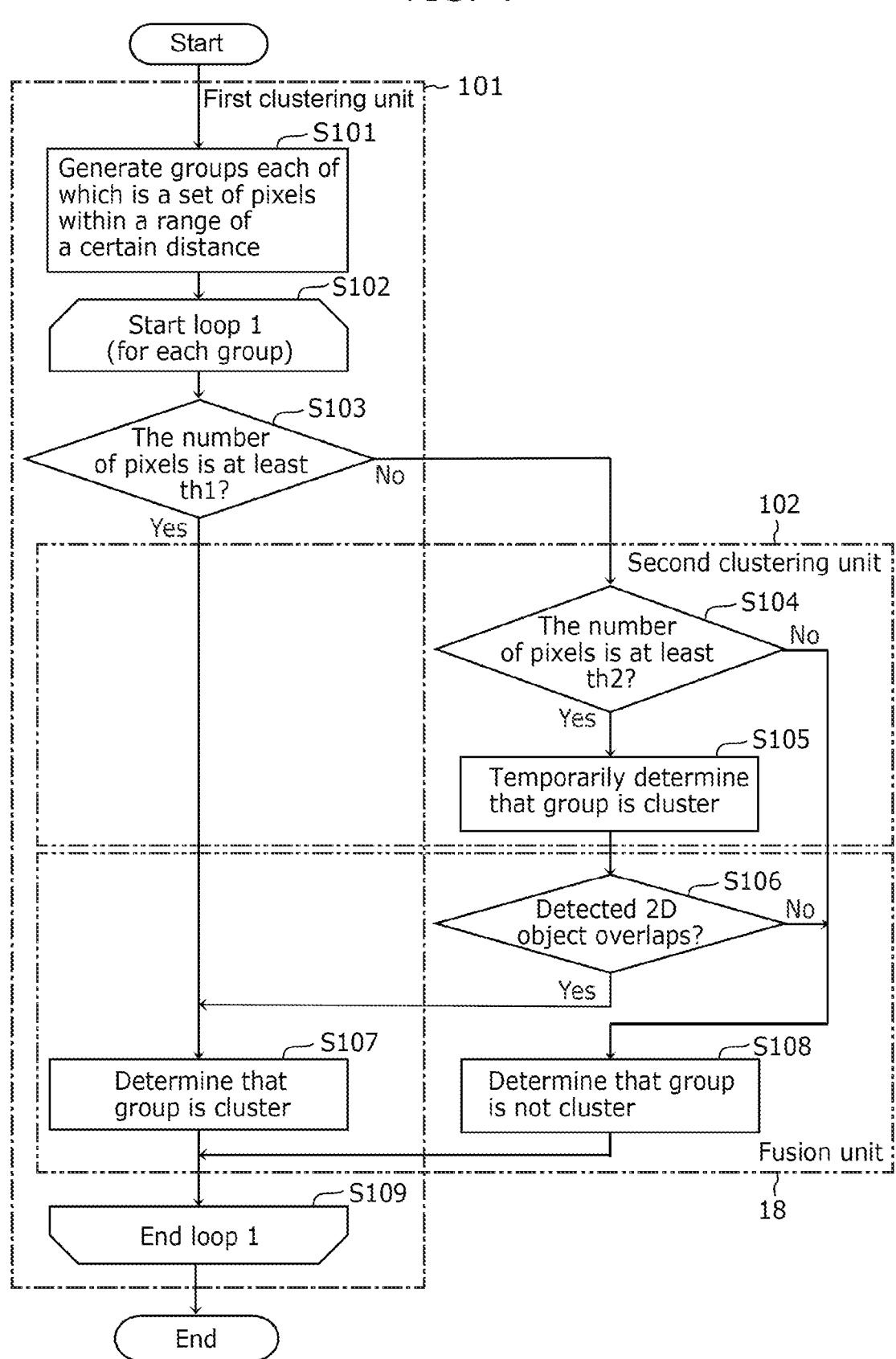
FIG. 4 is a flowchart illustrating a variation of the first clustering process and the second clustering process according to Embodiment 1.

Next, a variation of the clustering processes according to the embodiment will be described. Here, a variation of the first clustering process and second clustering process that are operations performed by object detecting device 100 will be described. FIG. 4 is a flowchart illustrating a variation of the first clustering process and the second clustering process according to Embodiment 1. FIG. 4 is different from the flowchart shown in FIG. 3 in that the flowchart shown in FIG. 4 additionally includes steps S105 and S106. Hereinafter, different points will be mainly described to avoid redundant description of the same points.

When second clustering unit 102 determines that the luminance of a pixel group is at least the second threshold (Yes in S104), second clustering unit 102 temporarily determines that the group is a cluster (S105). Thereafter, fusion unit 18 determines whether a result obtained by projecting an object that is an object indicated in 3D object information and is generated based on the group (i.e., the temporarily determined cluster) onto a 2D image overlaps an object indicated in 2D object information that is detected by two-dimensional object detector 20 (S106). When fusion unit 18 determines that the result overlaps the object indicated in the 2D object information (Yes in S106), fusion unit 18 determines that the group temporarily determined as a cluster is a cluster (S107). In other words, a judgment on the presence of an object generated based on the group (i.e., the temporarily determined cluster) is made. Alternatively, when fusion unit 18 determines that the result does not overlap the object indicated in the 2D object information (No in S106), fusion unit 18 determines that the group temporarily determined as a cluster is not a cluster (S108). In other words, a judgement on the absence of the object generated based on the group is made, and the object is deleted from the 3D object information.

With this, second clustering unit 102 can further increase the ability to detect a cluster and can increase the accuracy of detecting a cluster for an object having a low reflectance.

Note that first clustering unit 101, second clustering unit 102, and fusion unit 18 performs clustering processes on depth image D3 for determining a cluster; however, the clustering processes may be performed on point cloud data d3.

As has been described above, object detecting device 100 according to Embodiment 1 of the present disclosure includes: distance obtainer 13 that obtains a depth image; a first luminance obtainer that obtains a first luminance image corresponding to an image-capturing area same as an image capturing area of the depth image; first clustering unit 101 that generates a group that is a set of pixels that is within a certain range and is taken as a same object in the depth image, and determines that the group is a cluster when a total number of pixels included in the group is at least a first threshold; second clustering unit 102 that determines that the group is a cluster, when (i) the total number of pixels included in the group is less than the first threshold and (ii) luminance of a pixel group that is in the first luminance image and corresponds to the group is at least a second threshold; and three-dimensional (3D) object detector 17 that detects an object in the depth image based on the cluster, and generates 3D object information indicating the object detected.

With this, it is possible to increase the ability to detect an object having a low reflectance in a depth image.

Here, the luminance of the pixel group in the first luminance image may be an average luminance of pixels included in the pixel group.

With this, it is possible to increase the detection ability using the average luminance as the reference for an object having a low reflectance.

Here, the luminance of the pixel group in the first luminance image may be a maximum luminance of pixels included in the pixel group.

With this, it is possible to increase the detection ability using the maximum luminance as the reference for an object having a low reflectance.

Here, the luminance of the pixel group in the first luminance image may include both of an average luminance and a maximum luminance of the pixel group. The second threshold may include a threshold for the average luminance and a threshold for the maximum luminance. Second clustering unit 102 may determine that the group is a cluster, when the average luminance is at least the threshold for the average luminance and the maximum luminance is at least the threshold for the maximum luminance.

With this, it is possible to increase the detection ability using both the average luminance and the maximum luminance as the references for an object having a low reflectance.

Here, object detecting device 100 may further include a two-dimensional (2D) object detector that detects an object included in a 2D image corresponding to the image-capturing area, and generates 2D object information indicating the object detected; and fusion unit 18 that merges the 3D object information and the 2D object information together.

With this merging, it is possible to accurately demonstrate the object detection ability.

Here, when an object that is among objects included in the 3D object information and corresponds to the cluster determined by the second clustering unit overlaps the object indicated in the 2D object information, fusion unit 18 may further determine that the object corresponding to the cluster is a 3D object, and when the object corresponding to the cluster determined by the second clustering unit does not overlap the object indicated in the 2D object information, fusion unit 18 may further determine that the cluster determined by the second clustering unit is not a cluster and that the object corresponding to the cluster is not a 3D object.

With this, it is possible to further increase the ability to detect a cluster and to increase the accuracy of detecting a cluster for an object having a low reflectance.

Here, the 2D image may be the first luminance image. With this, it is possible to use an image sensor that mainly includes pixels having sensitivity to infrared light for obtaining the 2D image.

Here, object detecting device 100 may further include a second luminance obtainer that obtains a second luminance image for light having a wavelength different from a wavelength of light for which the first luminance image is obtained. The 2D image may be either the second luminance image or a third luminance image obtained by combining the first luminance image and the second luminance image.

With this, it is possible to use, for obtaining the 2D image, an image sensor that mainly includes pixels having sensitivity to infrared light, and an image sensor that includes pixels having sensitivity to infrared light and pixels having sensitivity to visible light.

Here, object detecting device 100 may further include: light emitter 4 that emits infrared light; image sensor 3 that receives reflected light that is a reflection of the infrared light; and signal processor 5 that generates the first luminance image and the depth image, using light emitter 4 and image sensor 3. The first luminance obtainer and the distance obtainer may obtain the first luminance image and the depth image, respectively, from signal processor 5.

With this, it is possible to use an image sensor having sensitivity to infrared light.

Here, object detecting device 100 may further include: light emitter 4 that emits infrared light; image sensor 3 that includes first pixels having sensitivity to infrared light and second pixels having sensitivity to visible light; and signal processor 5 that generates, using light emitter 4 and image sensor 3, the first luminance image and the depth image from pixel values of the first pixels and the second luminance image from pixel values of the second pixels. The first luminance obtainer, the second luminance obtainer, and the distance obtainer may obtain the first luminance image, the second luminance image, and the depth image, respectively, from signal processor 5.

With this, it is possible to use image sensor 3 including first pixels having sensitivity to infrared light and second pixels having sensitivity to visible light.

In addition, an object detecting method according to one aspect of Embodiment 1 includes obtaining a first luminance image corresponding to an image-capturing area, and a depth image corresponding to the image-capturing area of the first luminance image; generating a group that is a set of pixels that is within a certain range and is taken as a same object in the depth image; performing a first clustering process of determining that the group is a cluster included in an object, when a total number of pixels included in the group is at least a first threshold; performing a second clustering process of determining that the group is a cluster, when (i) the total number of pixels included in the group is less than the first threshold and (ii) luminance of a pixel group that is in the first luminance image and corresponds to the group is at least a second threshold; and detecting an object in the depth image based on the cluster to generate 3D object information indicating the object detected.

With this, it is possible to increase the ability to detect an object having a low reflectance in a depth image.

Here, the luminance of the pixel group in the first luminance image may be an average luminance of pixels included in the pixel group.

With this, it is possible to increase the detection ability using the average luminance as the reference for an object having a low reflectance.

Here, the luminance of the pixel group in the first luminance image is a maximum luminance of pixels included in the pixel group.

With this, it is possible to increase the detection ability using the maximum luminance as the reference for an object having a low reflectance.

Here, the luminance of the pixel group in the first luminance image may include both of an average luminance and a maximum luminance of the pixel group. The second threshold may include a threshold for the average luminance and a threshold for the maximum luminance. The performing of the second clustering process may include determining that the group is a cluster, when the average luminance is at least the threshold for the average luminance and the maximum luminance is at least the threshold for the maximum luminance.

With this, it is possible to increase the detection ability using both the average luminance and the maximum luminance as the references for an object having a low reflectance.

Here, the object detecting method may further include: detecting an object included in a 2D image corresponding to the image-capturing area; generating 2D object information indicating the object detected; and merging the 3D object information and the 2D object information together.

With this merging, it is possible to accurately detect an object.

Here, the object detecting method may further include: determining that, when an object that is among objects included in the 3D object information and corresponds to the cluster determined in the second clustering process overlaps the object indicated in the 2D object information, the object corresponding to the cluster is a 3D object; and determining that, when the object corresponding to the cluster determined in the second clustering process does not overlap the object indicated in the 2D object information, the cluster is not a cluster and that the object corresponding to the cluster is not a 3D object.

With this, it is possible to further increase the ability to detect a cluster and to increase the accuracy of detecting a cluster for an object having a low reflectance.

Here, the 2D image may be the first luminance image.

With this, it is possible to use an image sensor that mainly includes pixels having sensitivity to infrared light for obtaining the 2D image.

Here, the object detecting method may further include obtaining a second luminance image for light having a wavelength different from a wavelength of light for which the first luminance image is obtained. The 2D image may be either the second luminance image or a third luminance image obtained by combining the first luminance image and the second luminance image.

With this, it is possible to use, for obtaining the 2D image, an image sensor that mainly includes pixels having sensitivity to infrared light, and an image sensor that includes pixels having sensitivity to infrared light and pixels having sensitivity to visible light.

In addition, a computer program according to one aspect of Embodiment 1 is a program that causes a computer to execute the above-described object detecting method.

With this, it is possible to increase the ability to detect an object having a low reflectance in a depth image.

Embodiment 2

In this embodiment, an example of a configuration of object detecting device 100 that is to be included in a mobile object will be described. A mobile object here includes, for example, a vehicle such as an automobile, an agricultural implement, and a bicycle, a marine vehicle, an aircraft such as a drone, and the like.

[2.1 Configuration]

Figures 5, 6:
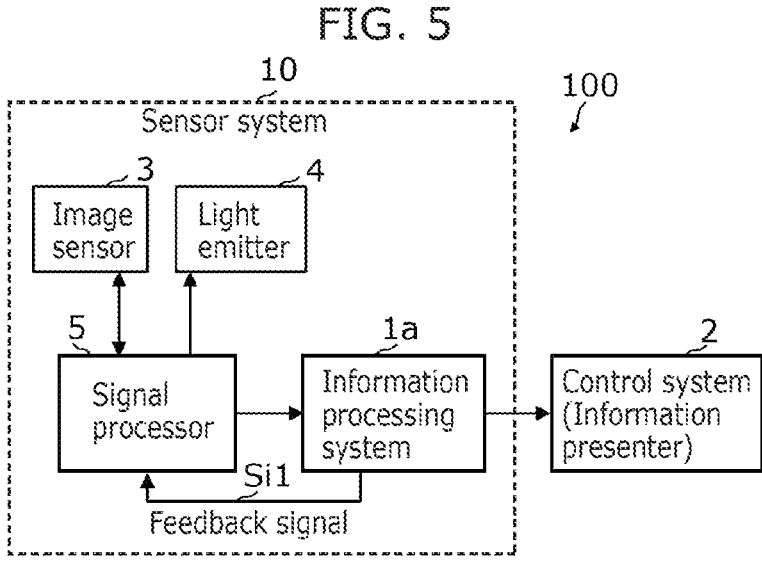
FIG. 5 is a block diagram illustrating an example of a configuration of an object detecting device according to Embodiment 2.
FIG. 6 is a block diagram illustrating an example of a detailed configuration of an information processing system according to Embodiment 2.

FIG. 5 is a block diagram illustrating an example of a configuration of object detecting device 100 according to Embodiment 2. Object detecting device 100 shown in FIG. 5 includes sensor system 10 and control system 2.

Sensor system 10 includes image sensor 3, light emitter 4, signal processor 5, and information processing system 1a. The foregoing image sensor 3, light emitter 4, and signal processor 5 may be the same as image sensor 3, light emitter 4, and signal processor 5 described in Embodiment 1. Information processing system 1a includes the same functions as the functions of information processing system 1 according to Embodiment 1, and additionally includes an in-vehicle function.

Control system 2 is an information presenter that appropriately presents information to an operator of a mobile object. For example, control system 2 causes a display device to display information for assisting with an operation of a mobile object according to an information processing result obtained from information processing system 1a. Note that control system 2 may assist with an operation (maneuvering) of a mobile object by controlling steering and braking of the mobile object according to an information processing result obtained from information processing system 1a.

FIG. 6 is a block diagram illustrating an example of a detailed configuration of information processing system 1a according to Embodiment 2. As compared to information processing system 1 shown in FIG. 1, main differences of information processing system 1a shown in FIG. 6 are that information processing system 1a additionally includes elements to which reference signs from 200 to 299 are given. Specifically, information processing system la additionally includes noise processor 214, tracking unit 219, second combiner 222, white line detector 223, white line bird's eye view generator 224, free space detector 225, parking slot detector 226, and outputter 227. Hereinafter, different points will be mainly described to avoid redundant description of the same points.

Odometry information D4, confidence information D5, and reference information D6 are input to information processing system 1a. Specifically, BW luminance image D1, IR luminance image D2, depth image D3, odometry information D4, confidence information D5, and reference information D6 are input to information processing system 1a as items of input data.

Odometry information D4 includes information that can be detected by a sensor included in a mobile object. For example, odometry information D4 includes an inclination angle of the mobile object, a traveling direction of the mobile object, a traveling speed of the mobile object, acceleration that acts on the mobile object, a pressed amount of a gas pedal (a degree of an accelerator opening), a pressed amount of a brake pedal, a steering angle, etc. Furthermore, odometry information D4 is information based on the current position of a mobile object which can be detected by the use of a global positioning system (GPS) or the like. For example, odometry information D4 includes the number of traffic lanes at the current position, a distinction between a white line and a yellow line on a road surface, a roadway width, the presence or absence of a sidewalk, a grade, the curvature of a curve, etc.

Confidence information D5 is information about data reliability. As one example, confidence information D5 is used for determining whether depth image D3 corresponds to a pseudo depth image affected by interference, multipath, etc. Likewise, confidence information D5 is used for determining whether BW luminance image D1 or IR luminance image D2 corresponds to pseudo luminance information.

Reference information D6 is information for changing a weighting factor used for combining BW luminance image D1 and IR luminance image D2. Specifically, reference information D6 includes information about a state of a white line during the day or the night, in the weather such as rain or fog, etc. As one example, reference information D6 includes information about ambient illuminance of an object and/or ambient humidity of the object.

In FIG. 6, noise processor 214 corrects depth image D3 using depth image D3 and at least one item of information that is to be selected from a group consisting of BW luminance image D1 and IR luminance image D2. The at least one item of information that is to be selected from a group consisting of BW luminance image D1 and IR luminance image D2 is any of (i) BW luminance image D1, (ii) IR luminance image D2, and (iii) luminance information (hereinafter, also called a "composite image") obtained by combining BW luminance image D1 and IR luminance image D2. Noise processor 214 is connected to distance obtainer 13. In this embodiment, noise processor 214 is connected to IR luminance obtainer 12 via first combiner 21. Specifically, BW luminance image D1 or IR luminance image D2 is not directly input to noise processor 214. BW luminance image D1 or IR luminance image D2 are indirectly input to noise processor 214 via first combiner 21. Depth image D3 itself has a relatively low S/N, and thus the ratio of noise is high. For this reason, noise in depth image D3 is reduced in noise processor 214.

Tracking unit 219 tracks an object present within a monitoring area. Tracking unit 219 tracks an object indicated in 3D object information merged in fusion unit 18 by making a comparison between a plurality of frames that are outputs of image sensor 3. With this, tracking unit 219 can identify an object before traveling and an object after traveling as the same object, even if the object travels within a monitoring area. A tracking result obtained by tracking unit 219 is output to outputter 227 as target information D11. In addition, odometry information D4 is also input to tracking unit 219.

Second combiner 222 combines BW luminance image D1 and IR luminance image D2 from BW luminance obtainer 11 and IR luminance obtainer 12, respectively. Like first combiner 21, second combiner 222 also has a function as a selector that alternatively outputs BW luminance image D1 and IR luminance image D2. BW luminance image D1 and IR luminance image D2 combined by second combiner 222 are input to white line detector 223. For this reason, second combiner 222 is appropriately controlled such that an output of second combiner 222 is a composite image suitable for an operation of white line detector 223. Reference information D6 is further input to second combiner 222. Second combiner 222 generates a composite image by appropriately changing a weighting factor according to the state of a white line during the day or the night, in the weather such as rain or fog, etc.

In this embodiment, an output of first combiner 21 is input to two-dimensional object detector 20, and an output of second combiner 222 is input to white line detector 223. Since objects to be detected that correspond to respective outputs of first combiner 21 and second combiner 222 are different as described above, first combiner 21 and second combiner 222 may use different weighting factors when generating composite images.

Here, both first combiner 21 and second combiner 222 function as a "combiner" that combines BW luminance image D1 and IR luminance image D2. These combiners (first combiner 21 and second combiner 222) have a function of combining BW luminance image D1 and IR luminance image D2 so as to correct information about positions of second pixel 31 and first pixel 32. The combiners (first combiner 21 and second combiner 222) change, according to reference information D6 to be input, a weighting factor used for combining BW luminance image D1 and IR luminance image D2.

White line detector 223 detects an area that is to be a candidate for a white line drawn on a road surface. White line detector 223 detects a candidate area for a white line based on a composite image of BW luminance image D1 and IR luminance image D2 which is input from second combiner 222. In addition, confidence information D5 is input to white line detector 223. As one example of implementing detection of a white line, edge detection or the like using a filter is performed on a composite image of BW luminance image D1 and IR luminance image D2 to detect a portion at which a pixel value (brightness) sharply changes. Here, a white line to be detected by white line detector 223 is not limited to a white-colored line. For example, white line detector 223 may detect a yellow line (yellow-colored line), an illustration, a pattern, etc.

White line bird's eye view generator 224 is provided subsequent to white line detector 223. White line bird's eye view generator 224 converts coordinates of a composite image of BW luminance image D1 and IR luminance image D2 such that the composite image is taken as a bird's-eye-view image that captures, from directly above, at least a candidate area for a white line and the vicinity of the candidate area that are detected by white line detector 223.

Free space detector 225 detects, based on depth image D3, a free space within a white line, namely, an empty space. In this embodiment, depth image D3 in which an object and a peripheral area located around the object are separated is input to free space detector 225 from separator 16. Free space detector 225 detects a free space within a white line using depth image D3 input from separator 16. A detection result obtained by free space detector 225 is output to outputter 227 as free space information D13. In addition, odometry information D4 is also input to free space detector 225.

Parking slot detector 226 detects an empty parking slot within a white line, namely, an empty parking slot in which no other vehicle is parked. A plurality of parking slots are typically provided for the parking lot of commercial facilities, hospitals, parks, stadiums, halls, or transportation facilities. A user of such a parking lot searches for an empty parking slot to park their own vehicle (mobile object) in the empty parking slot. According to parking slot detector 226, an empty parking slot can be automatically searched in the above-described case. In this embodiment, a detection result obtained by free space detector 225 and an output (a candidate area for a white line after coordinate conversion is performed) of white line bird's eye view generator 224 are input to parking slot detector 226. Parking slot detector 226 pairs the detection result obtained by free space detector 225 and the output (the candidate area for a white line after coordinate conversion is performed) of white line bird's eye view generator 224 together to determine an empty parking slot. For example, parking slot detector 226 determines, from among parking slots each having a size that allows a mobile object to park within a white line, a parking slot positionally overlapping a free space as an empty parking slot. A detection result obtained by parking slot detector 226 is output to outputter 227 as empty parking slot information D14.

Outputter 227 outputs information processing results obtained by performing, based on BW luminance image D1, IR luminance image D2, and depth image D3, information processing pertaining to a state of a white line within the angle of view of image sensor 3. Specifically, information processing system 1a according to the embodiment performs various kinds of information processing pertaining to a state of a white line based on BW luminance image D1, IR luminance image D2, and depth image D3 obtained from image sensor 3, and outputs results obtained by performing the various kinds of information processing from outputter 227. As one example, in this embodiment, outputter 227 outputs target information D11, road surface information D12, free space information D13, and empty parking slot information D14 obtained from tracking unit 219, separator 16, free space detector 225, and parking slot detector 226, respectively. Outputter 227 outputs these items of information to control system 2.

In this embodiment, an information processing result includes at least one item of the following items of information: (i) information about the presence and absence of an object within a white line in the vicinity of a mobile object, (ii) information about the position of an object in a white line which is present within the white line, and (iii) information about an attribute of an object. Specifically, target information D11 includes all of the following items of information: (i) information about the presence and absence of an object within a white line in the vicinity of a mobile object, (ii) information about the position of an object in a white line which is present within the white line, and (iii) information about an attribute of an object. The term "attribute" in the present disclosure includes, for example, a distinction between (i) a human and non-human animals or objects, (ii) a mobile object (a human, an automobile, a bicycle, etc.) and an immobile object, (iii) a street tree, a traffic light, guardrail, etc. In addition, an "attribute" of an object includes the size, color, movement (change), etc. of the object. Furthermore, when an object is a human, an "attribute" of the object may include the gender, height, figure, age, etc. When an object is a mobile object, an "attribute" of the object may include the traveling direction, traveling speed, etc.

Here, information output by outputter 227 changes as appropriate according to a request made by a destination of the output. For example, when outputs of outputters 227 output from a plurality of mobile objects are compiled for the cloud (cloud computing), etc., outputters 227 may output metainformation.

Note that fusion unit 18 may output feedback signal Si1 to sensor system 10 that includes image sensor 3. Here, image sensor 3 outputs an electrical signal whose one or more parameters that are selected from a group consisting of an exposure time and a frame rate are changed by feedback signal Si1. Specifically, feedback signal Si1 output by fusion unit 18 is fed back to signal processor 5 as shown in FIG. 5. Feedback signal Si1 includes a detection result obtained by three-dimensional object detector 17 which is the output of fusion unit 18. Image sensor 3 changes the exposure time and/or frame rate according to the above-described feedback signal Si1.

[2.2 Operation]

Figure 7:
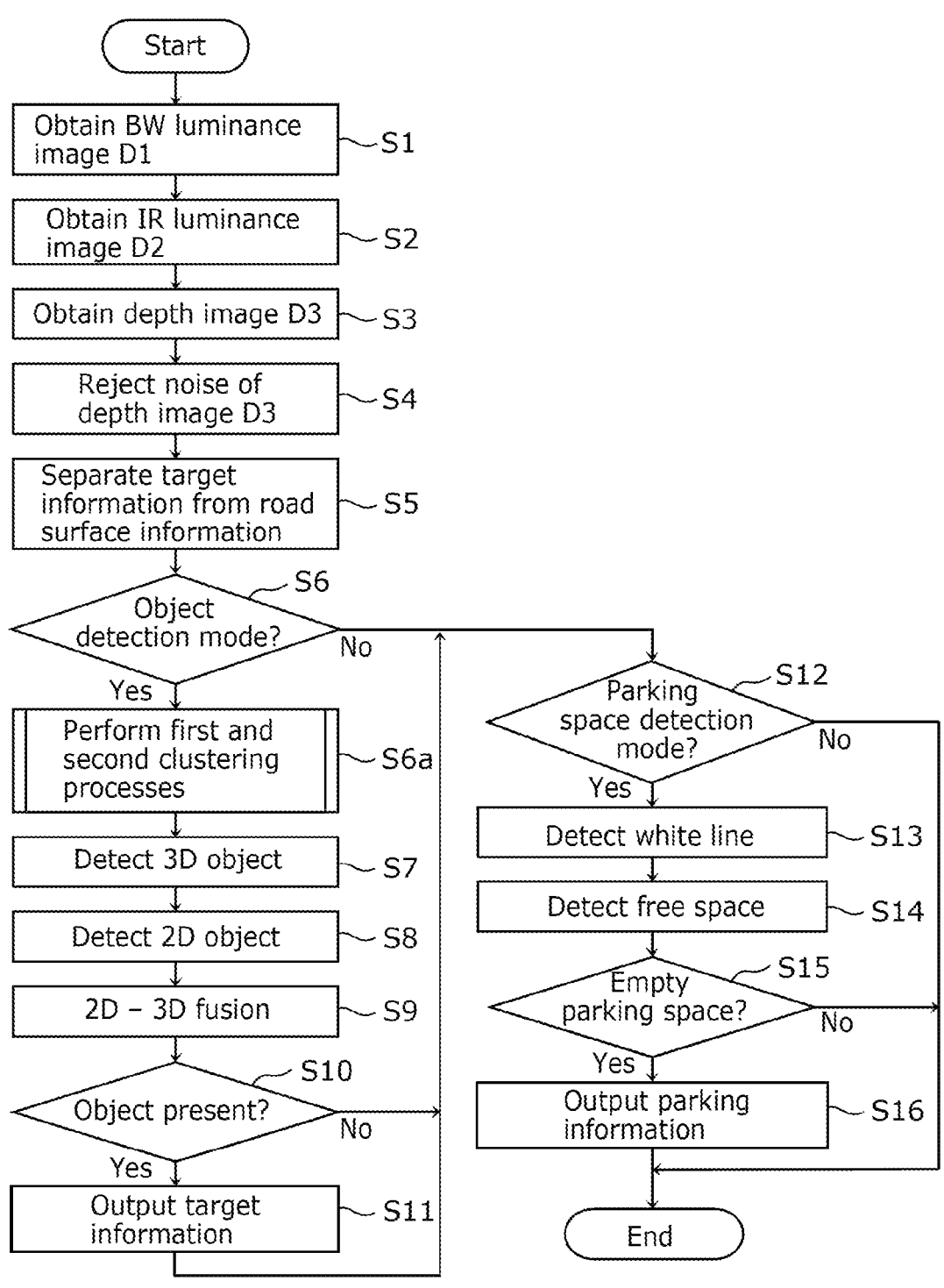
FIG. 7 is a flowchart illustrating an example of operations performed by the object detecting device according to Embodiment 2.

Next, operations performed by object detecting device 100 according to the embodiment will be described. FIG. 7 is a flowchart illustrating an example of operations performed by the object detecting device according to Embodiment 2.

Information processing system 1a according to the embodiment has a plurality of operation modes including at least a parking space detection mode and an object detection mode. These operation modes can be individually switched between the enabled state and disabled state. For example, when the parking space detection mode is enabled and all other operation modes other than the parking space detection mode are disabled, information processing system 1a operates only in the parking space detection mode. The parking space detection mode is an operation mode of detecting an empty parking slot. In this operation mode, empty parking slot information D14 is output from outputter 227. The object detection mode is an operation mode of detecting an object within a monitoring area. In this operation mode, the above-described target information D11 is output from outputter 227.

Specifically, as illustrated in FIG. 7, information processing system 1a performs a BW luminance obtaining process (S1) for obtaining BW luminance image D1, an IR luminance obtaining process (S2) for obtaining IR luminance image D2, and a distance obtaining process (S3) for obtaining depth image D3. Information processing system 1a successively performs the BW luminance obtaining process, the IR luminance obtaining process, and the distance obtaining process (S1 through S3) in BW luminance obtainer 11, IR luminance obtainer 12 and distance obtainer 13, respectively.

Next, information processing system 1a corrects, in noise processor 214, depth image D3 using depth image D3 and at least one item of information to be selected from a group consisting of BW luminance image D1 and IR luminance image D2, to perform a noise rejection process of reducing noise of depth image D3 (S4).

Next, information processing system 1a performs, in separator 16, a separation process on depth image D3 whose coordinates have been converted to separate an object and a peripheral area located around the object (S5).

Next, information processing system 1a determines whether the object detection mode is enabled (S6). When the object detection mode is enabled (Yes in S6), information processing system 1a performs a series of processes (S6a and S7 through S11) for detecting an object. Specifically, information processing system 1a performs a first clustering process and a second clustering process in first clustering unit 101 and second clustering unit 102, respectively (S6a), a three-dimensional object detecting process of detecting an object in three-dimensional object detector 17 (S7), and two-dimensional object detecting process of detecting an object in two-dimensional object detector 20 (S8). Here, step S6a may be the same as the clustering processes shown in the flowchart illustrated in FIG. 3 or FIG. 4.

Next, in fusion unit 18, information processing system 1a uses a detection result (two-dimensional object detection result) obtained by two-dimensional object detector 20 to perform a fusion process of correcting a detection result (three-dimensional object detection result) obtained by three-dimensional object detector 17 (S9).

Note that when a cluster temporarily determined in step S6a is present, an overlap between the applicable three-dimensional object detection result and the applicable two-dimensional object detection result is determined in step S9 in accordance with FIG. 4.

Next, information processing system 1a determines whether an object is present from a result of the fusion process (S10). When an object is present (Yes in S10), information processing system 1a outputs target information D11 from outputter 227 (S11), and determines whether the parking space detection mode is enabled (S12). When an object is absent (No in S10), information processing system 1a shifts to process S12, without outputting target information D11.

When the parking space detection mode is enabled (Yes in S12), information processing system 1a performs a series of processes (S13 through S16) for detecting an empty parking slot. Specifically, information processing system 1a detects a candidate area for a white line in white line detector 223 (S13), and detects a free space in free space detector 225 (S14). From these results, information processing system 1a determines, in parking slot detector 226, whether there is an empty parking slot within a monitoring area (S15).

When there is an empty parking slot (Yes in S15), information processing system 1a outputs, from outputter 227, empty parking slot information D14 (S16), and ends the series of processes. When there is no empty parking slot (No in S15), information processing system 1a does not output empty parking slot information D14 (S16), and ends the series of processes.

When the object detection mode is disabled (No in S6), information processing system 1a skips the series of processes (S6a and S7 through S11) for detecting an object, and shifts to process S12. When the parking space detection mode is disabled (No in S12), information processing system 1a skips the series of processes (S13 through S16) for detecting an empty parking slot, and ends the process.

Information processing system 1a repeatedly performs the above-described series of processes S1 through S16. The flowchart illustrated in FIG. 7 is merely an example of all of operations performed by information processing system 1a. Accordingly, a process may be appropriately omitted or the order of the processes may be appropriately changed. For example, the order of processes S1 through S3 may be changed, and BW luminance image D1 may be obtained (S1) after IR luminance image D2 and depth image D3 are obtained (S2 and S3).

As has been described above, object detecting device 100 according to one aspect of Embodiment 2 of the present disclosure includes, as control system 2, an information presenter that presents, based on the 3D object information, information that assists a mobile object that includes the object detecting device in traveling.

With this, it is possible to increase the ability to detect an object having a low reflectance in a depth image. In addition, control system 2 is suitable for object detecting device 100 that is included in a mobile object.

Note that image sensor 3 may include two solid-state imaging apparatuses or may include three solid-state imaging apparatuses, instead of including one solid-state imaging apparatus. However, these two or three imaging apparatuses need to be able to form associations between pixels of BW luminance image D1, IR luminance image D2, and depth image D3.

Each of the elements in the above-described embodiments may be configured as a dedicated hardware product or may be implemented by executing a software program suitable for each element. Each element may be implemented as a result of a program execution unit, such as a central processing unit (CPU), processor or the like, loading and executing a software program stored in a storage medium such as a hard disk or a semiconductor memory.

Hereinbefore, object detecting device 100, the object detecting method, and the program according to one or more aspects have been described based on the embodiments; however, the present disclosure is not limited to these embodiments. The scope of the one or more aspects of the present disclosure may encompass embodiments as a result of making, to the embodiments, various modifications that may be conceived by those skilled in the art and combining elements in different embodiments, as long as the resultant embodiments do not depart from the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used for object detecting devices that detect an object in a luminance image and a depth image.

The invention claimed is:

1. An object detecting device comprising:
a distance obtainer that obtains a depth image;
a first luminance obtainer that obtains a first luminance image corresponding to an image-capturing area same as an image capturing area of the depth image;
a first clustering unit that generates one or more groups, each of which is a set of pixels that is within a certain range and is taken as a same object in the depth image, and determines that any of the one or more groups is a first cluster when a total number of pixels included therein is at least a first threshold;
a second clustering unit that determines that, when it is determined, by the first clustering unit that the total number of pixels included in a group among the one or more groups is less than the first threshold, determines whether luminance of a pixel group that is in the first luminance image and corresponds to the group is at least a second threshold, and when it is determined that the luminance of the pixel group is at least the second threshold, detects the group as a second cluster; and
a three-dimensional (3D) object detector that detects an object in the depth image based on at least one of the first cluster or the second cluster, and generates 3D object information indicating the object detected.

2. The object detecting device according to claim 1, wherein
the luminance of the pixel group in the first luminance image is an average luminance of pixels included in the pixel group.

3. The object detecting device according to claim 1, wherein
the luminance of the pixel group in the first luminance image is a maximum luminance of pixels included in the pixel group.

4. The object detecting device according to claim 1, wherein
the luminance of the pixel group in the first luminance image includes both of an average luminance and a maximum luminance of pixels included in the pixel group,
the second threshold includes a threshold for the average luminance and a threshold for the maximum luminance, and
the second clustering unit determines that the group is the second cluster, when the average luminance is at least the threshold for the average luminance and the maximum luminance is at least the threshold for the maximum luminance.

5. The object detecting device according to claim 1, further comprising:
a two-dimensional (2D) object detector that detects an object included in a 2D image corresponding to the image-capturing area, and generates 2D object information indicating the object detected; and
a fusion unit that merges the 3D object information and the 2D object information together.

6. The object detecting device according to claim 5, wherein
when an object that is among objects included in the 3D object information and corresponds to the second cluster determined by the second clustering unit overlaps the object indicated in the 2D object information, the fusion unit further determines that the object corresponding to the second cluster is a 3D object, and when the object corresponding to the second cluster determined by the second clustering unit does not overlap the object indicated in the 2D object information, the fusion unit further determines that the second cluster determined by the second clustering unit is not a cluster and that the object corresponding to the second cluster is not a 3D object.

7. The object detecting device according to claim 5, wherein the 2D image is the first luminance image.

8. The object detecting device according to claim 5, further comprising:
a second luminance obtainer that obtains a second luminance image for light having a wavelength different from a wavelength of light for which the first luminance image is obtained, wherein
the 2D image is either the second luminance image or a third luminance image obtained by combining the first luminance image and the second luminance image.

9. The object detecting device according to claim 8, further comprising:
a light emitter that emits infrared light;
an image sensor that includes first pixels having sensitivity to infrared light and second pixels having sensitivity to visible light; and
a signal processor that generates, using the light emitter and the image sensor, the first luminance image and the depth image from pixel values of the first pixels and the second luminance image from pixel values of the second pixels, wherein
the first luminance obtainer, the second luminance obtainer, and the distance obtainer obtain the first luminance image, the second luminance image, and the depth image, respectively, from the signal processor.

10. The object detecting device according to claim 1, further comprising:
a light emitter that emits infrared light;
an image sensor that receives reflected light that is a reflection of the infrared light; and
a signal processor that generates the first luminance image and the depth image, using the light emitter and the image sensor, wherein
the first luminance obtainer and the distance obtainer obtain the first luminance image and the depth image, respectively, from the signal processor.

11. The object detecting device according to claim 1, further comprising:
an information presenter that presents, based on the 3D object information, information that assists a mobile object that includes the object detecting device in traveling.

12. An object detecting method comprising:
obtaining a first luminance image corresponding to an image-capturing area, and a depth image corresponding to the image-capturing area of the first luminance image;
generating one or more groups, each of which is a set of pixels that is within a certain range and is taken as a same object in the depth image;
performing a first clustering process of determining that any of the one or more groups is a first cluster included in an object, when a total number of pixels therein is at least a first threshold;
performing a second clustering process of determining that, when it is determined, by the first clustering process that the total number of pixels included in a group among the one or more groups is less than the first threshold, determining whether luminance of a pixel group that is in the first luminance image and corresponds to the group is at least a second threshold, and when it is determined that the luminance of the pixel group is at least the second threshold, detecting the group as a second cluster; and detecting an object in the depth image based on at least one of the first cluster or the second cluster to generate 3D object information indicating the object detected.

13. The object detecting method according to claim 12, wherein the luminance of the pixel group in the first luminance image is an average luminance of pixels included in the pixel group.

14. The object detecting method according to claim 12, wherein the luminance of the pixel group in the first luminance image is a maximum luminance of pixels included in the pixel group.

15. The object detecting method according to claim 12, wherein the luminance of the pixel group in the first luminance image includes both of an average luminance and a maximum luminance of the pixel group, the second threshold includes a threshold for the average luminance and a threshold for the maximum luminance, and the performing of the second clustering process includes determining that the group is the second cluster, when the average luminance is at least the threshold for the average luminance and the maximum luminance is at least the threshold for the maximum luminance.

16. The object detecting method according to claim 12, further comprising:

detecting an object included in a 2D image corresponding to the image-capturing area;

generating 2D object information indicating the object detected; and merging the 3D object information and the 2D object information together.

17. The object detecting method according to claim 16, further comprising:

determining that, when an object that is among objects included in the 3D object information and corresponds to the second cluster determined in the second clustering process overlaps the object indicated in the 2D object information, the object corresponding to the second cluster is a 3D object; and determining that, when the object corresponding to the second cluster determined in the second clustering process does not overlap the object indicated in the 2D object information, the second cluster is not a cluster and that the object corresponding to the second cluster is not a 3D object.

18. The object detecting method according to claim 16, wherein the 2D image is the first luminance image.

19. The object detecting method according to claim 16, further comprising:

obtaining a second luminance image for light having a wavelength different from a wavelength of light for which the first luminance image is obtained, wherein the 2D image is either the second luminance image or a third luminance image obtained by combining the first luminance image and the second luminance image.

20. A non-transitory computer-readable recording medium for use in a computer, the recording medium having recorded thereon a computer program for causing the computer to execute the object detecting method according to claim 12.

* * * * *